(12) United States Patent
Chan et al.

(10) Patent No.: US 11,579,653 B2
(45) Date of Patent: Feb. 14, 2023

(54) DOCKING STATION AND CONTROL METHOD CAPABLE OF AUTOMATICALLY SETTING UPLINK PORT

(71) Applicant: GOOD WAY TECHNOLOGY CO., LTD., New Taipei (TW)

(72) Inventors: Chien-Chih Chan, New Taipei (TW); Chang-Chieh Yang, New Taipei (TW); Chung-Nan Ko, New Taipei (TW); Liang-Hung Yu, New Taipei (TW)

(73) Assignee: GOOD WAY TECHNOLOGY CO., LTD., New Taipei (TW)

( * ) Notice: Subject to any disclaimer, the term of this patent is extended or adjusted under 35 U.S.C. 154(b) by 226 days.

(21) Appl. No.: 16/911,729

(22) Filed: Jun. 25, 2020

(65) Prior Publication Data

US 2021/0405698 A1 Dec. 30, 2021

(51) Int. Cl.
*G06F 1/16* (2006.01)
*G06F 13/40* (2006.01)
*G06F 13/42* (2006.01)
*G06F 13/38* (2006.01)

(52) U.S. Cl.
CPC .......... *G06F 1/1632* (2013.01); *G06F 13/385* (2013.01); *G06F 13/4022* (2013.01); *G06F 13/4282* (2013.01); *G06F 2213/0042* (2013.01); *G06F 2213/4004* (2013.01)

(58) Field of Classification Search
CPC .............................. G06F 1/1632; G06F 13/4022
See application file for complete search history.

(56) References Cited

U.S. PATENT DOCUMENTS

| 9,723,358 B1* | 8/2017 | Chan ................... G06F 13/4282 |
| 2006/0206650 A1 | 9/2006 | Chang | |
| 2011/0093623 A1* | 4/2011 | Chen ..................... G06F 1/1632 |
| | | | 710/14 |
| 2017/0345428 A1 | 11/2017 | Chen et al. | |

FOREIGN PATENT DOCUMENTS

TW          I603200 B    10/2017

* cited by examiner

*Primary Examiner* — David E Martinez
(74) *Attorney, Agent, or Firm* — Li & Cai Intellectual Property (USA) Office

(57) ABSTRACT

A docking station and a control method thereof are provided. The docking station includes a first USB interface, a second USB interface, a video signal output terminal, a microcontroller, a first signal multiplexer, a second signal multiplexer, a video signal processor, and a video signal converter. The microcontroller determines whether the first USB interface or the second USB interface is connected to an electronic device. When the first USB interface is connected to the electronic device, the microcontroller sets the first USB interface as an uplink port. The uplink port receives a signal from the electronic device, and selects and outputs a video signal through the signal. The video signal processor is configured to receive and process the video signal. The video signal converter converts the video signal into a video output signal that is capable of being output to the video signal output terminal for playing.

10 Claims, 5 Drawing Sheets

DOCKING STATION AND CONTROL METHOD CAPABLE OF AUTOMATICALLY SETTING UPLINK PORT

FIELD OF THE DISCLOSURE

The present disclosure relates to a docking station, and more particularly to a docking station and a control method of a docking station that are capable of automatically setting an uplink port.

BACKGROUND OF THE DISCLOSURE

A conventional docking station includes a plurality of USB interfaces. When the conventional docking station leaves the factory, one of the universal serial bus (USB) interfaces is preset as an uplink port, while the other USB interfaces are preset as downlink ports. The uplink port is used to connect to an active electronic device (e.g., a computer), and the downlink ports are used to connect to passive electronic devices (e.g., pen drives).

The conventional docking station is designed by printing a pattern on a casing of the conventional docking station, in order to identify which one of the USB interfaces is the uplink port, and which ones of the USB interfaces are downlink ports. Before connecting the active electronic device to the conventional docking station, a user has to identify the uplink port through visually observing the pattern. However, the method of identifying the uplink port by the pattern is not convenient. Furthermore, when the user fails to notice the pattern and connects the active electronic device to one of the USB interfaces corresponding to one of the downlink ports, the conventional docking station will not work. Accordingly, the user led to mistakenly believe that the conventional docking station is damaged.

SUMMARY OF THE DISCLOSURE

In response to the above-referenced technical inadequacies, the present disclosure provides a docking station and a control method of a docking station to effectively improve on the issues associated with conventional docking stations.

In one aspect, the present disclosure provides a docking station, which includes a first universal serial bus (USB) interface, a second USB interface, a video signal output terminal, a microcontroller, a first signal multiplexer, a second signal multiplexer, and a video signal processor, a video signal converter. The microcontroller is electrically connected to the first USB interface and the second USB interface. The microcontroller is capable of determining through an operation program whether or not the first USB interface or the second USB interface is electrically connected to a first electronic device. When the first USB interface is electrically connected to the first electronic device, the operation program sets the first USB interface as an uplink port and the second USB interface as a downlink port. The first signal multiplexer is electrically connected to the microcontroller. The first signal multiplexer is configured to be electrically connected to the first electronic device through the uplink port. The uplink port is capable of receiving a first signal from the first electronic device, and is configured to select and output a video signal through the first signal. The second signal multiplexer is electrically connected to the microcontroller. The second signal multiplexer is configured to be electrically connected to the second electronic device through the downlink port. The second signal multiplexer is capable of receiving a second signal from the second electronic device. The video signal processor is electrically connected to the microcontroller and the first signal multiplexer. The video signal processor is configured to receive and process the video signal. The video signal converter is electrically connected to the video signal processor. The video signal converter is capable of receiving the video signal that has undergone signal processing by the video signal processor. The video signal converter is configured to convert the video signal into a video output signal that is capable of being output to the video signal output terminal for playing.

In certain embodiments, the present disclosure provides a control method of the docking station, which includes: detecting whether one of a plurality of USB interfaces is electrically connected to an electronic device; setting the one of the USB interfaces electrically connected to the electronic device as an uplink port and each of the other USB interfaces as a downlink port when an electrical connection between the one of the USB interfaces and the electronic device is detected; allowing one of the electronic devices electrically connected to the uplink port to transmit a video signal to a video signal processor; receiving the video signal that has undergone signal processing through the video signal processor, wherein the video signal processor receives and processes the video signal; and converting the video signal into a video output signal through a video signal converter and outputting the video output signal to a video signal output terminal for playing.

Therefore, the docking station and the control method thereof of the present disclosure can detect the USB interfaces through the microcontroller, in which one of the USB interfaces that is firstly and electrically connected to the electronic device can be set as the uplink port, and the other USB interfaces can be set as the downlink ports. Accordingly, when using the docking station of the present disclosure, a user can directly and electrically connect the electronic device to any one of the USB interfaces without the need of identifying which one of the USB interfaces is the uplink port. The microcontroller can automatically set one of the USB interfaces electrically connected to the electronic device as the uplink port to output the video signal to the video signal output terminal for playing.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
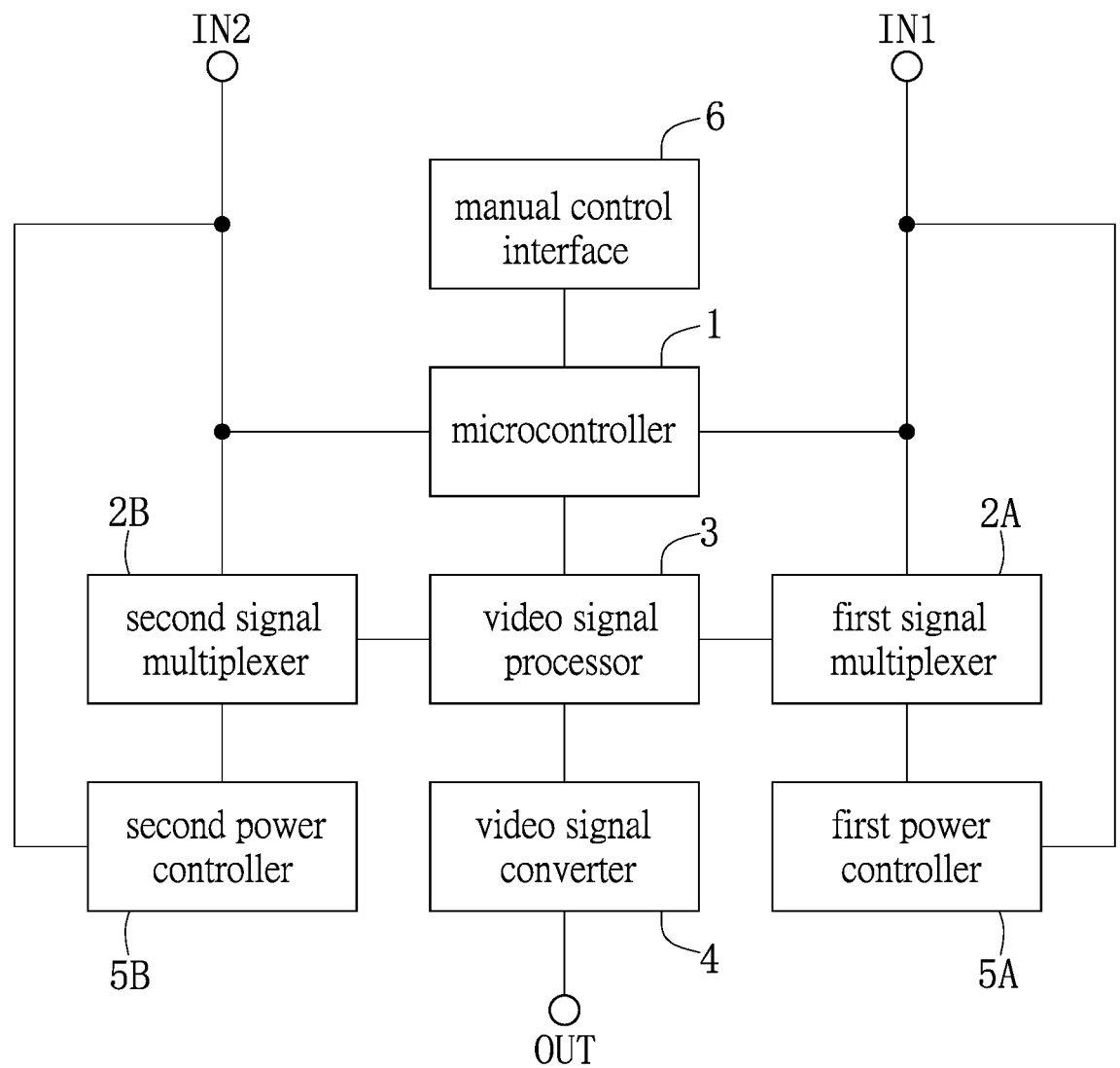
FIG. 1 is a circuit block diagram of a docking station according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
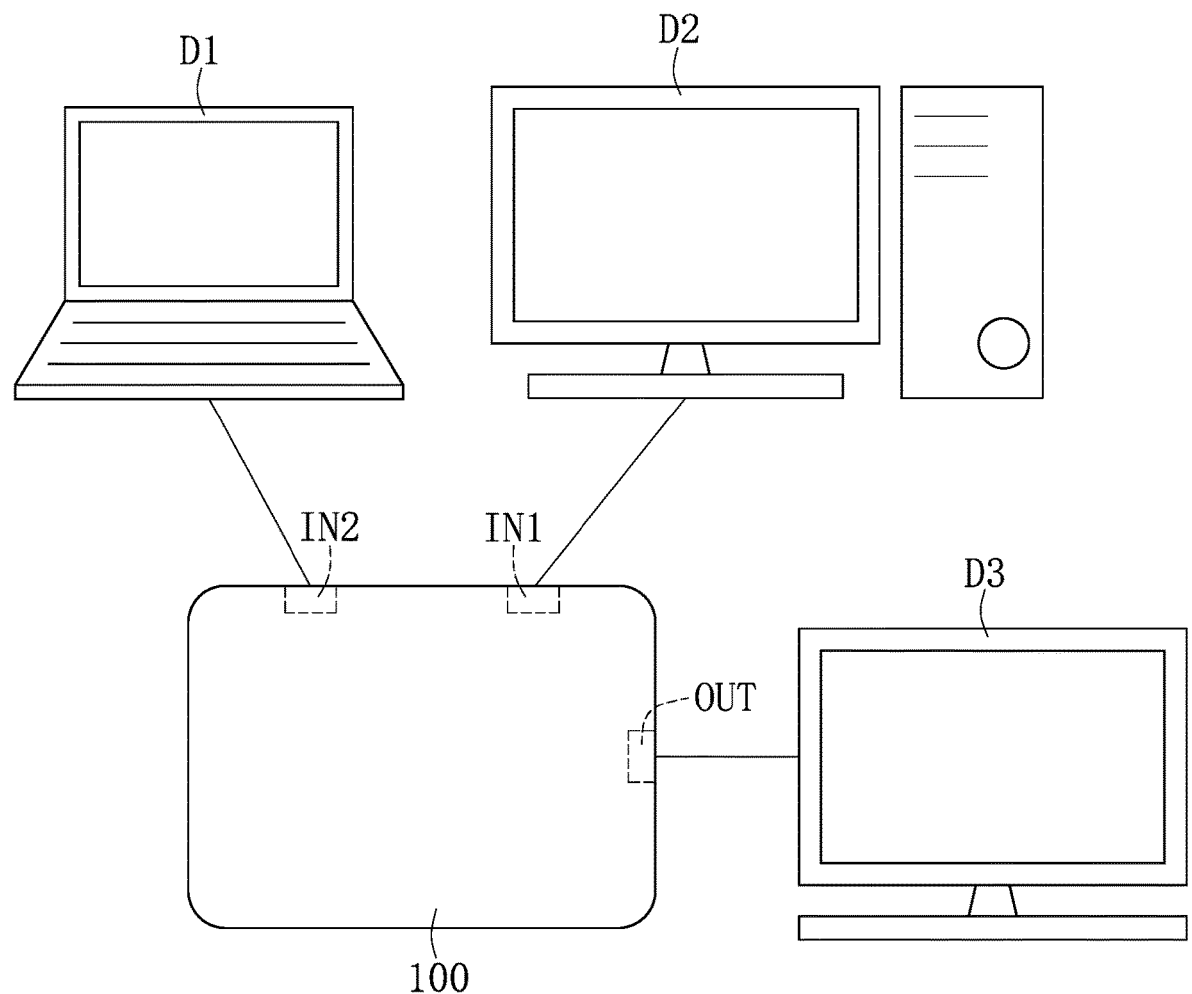
FIG. 2 is a usage status diagram of the docking station according to the first embodiment of the present disclosure.

Referring to FIG. 1 and FIG. 2, a first embodiment of the present disclosure provides a docking station that includes a first universal serial bus (USB) interface IN1, a second USB interface IN2, and a video signal output terminal OUT, but the present disclosure is not limited thereto. For example, in other embodiments of the present disclosure, the number of the USB interfaces of the docking station 100 can be adjusted according to the needs of the designer (e.g., the number of the USB interfaces is five). It should be noted that connector specifications of the first USB interface IN1 and the second USB interface IN2 in the present embodiment are USB Type-C®, and transmission specifications of the first USB interface IN1 and the second USB interface IN2 in the present embodiment are USB 3.1, but the present disclosure is not limited thereto.

The docking station 100 further includes a microcontroller 1 electrically connected to the first USB interface IN1 and the second USB interface IN2, a first signal multiplexer 2A electrically connected to the microcontroller 1, a second signal multiplexer 2B electrically connected to the microcontroller 1, a video signal processor 3 electrically connected to the microcontroller 1 and the first signal multiplexer 2A, a video signal converter 4 electrically connected to the video signal processor 3, a first power controller 5A electrically connected to the first multiplexer 2A and the first USB interface IN1, and a second power controller 5B that is electrically connected to the second multiplexer 2B and the second USB interface IN2. It should be noted that the multiplexers of the docking station 100 are designed to cooperate with the USB interfaces. In other words, the number of the multiplexers of the docking station 100 can be adjusted according to the number of the USB interfaces.

The microcontroller 1 is electrically connected to the first USB interface IN1 and the second USB interface IN2. The microcontroller 1 is capable of connecting to a first electronic device D1 and a second electronic device D2 through the first USB interface IN1 and the second USB interface IN2, respectively. For the convenience of description, the first electronic device D1 and the second electronic device D2 in the present embodiment are active devices (e.g., computers, mobile phones, or tablets). The first electronic device D1 is an active device operated by a user, and is used for outputting an image, but the present disclosure is not limited thereto. For example, in other embodiments of the present disclosure, the second electronic device D2 may be an active device, and the first electronic device D1 may be a passive device (e.g., a pen drive). In other words, the second electronic device D2 is an active device operated by the user.

The microcontroller 1 is capable of determining through an operation program whether or not the first USB interface IN1 or the second USB interface IN2 is electrically connected to the first electronic device D1 through an operation program. When the first USB interface IN1 is electrically connected to the first electronic device D1, the operation program sets the first USB interface IN1 as an uplink port and sets the second USB interface IN2 as a downlink port.

Specifically, the microcontroller 1 is preset with the operation program. The microcontroller 1 sequentially detects the first USB interface IN1 and the second USB interface IN2 to confirm which interface has been electrically connected to the first electronic device D1 through the operation program. At this time, the second electronic device D2 is not electrically connected to the docking station 100. For example, when the first electronic device D1 is electrically connected to the first USB interface IN1 and the microcontroller 1 detects that the first USB interface IN1 is electrically connected to the first electronic device D1 through the operation program, the microcontroller 1 sets the first USB interface IN1 as the uplink port, and sets the second USB interface IN2 as the downlink port through the operation program. At this time, the user can electrically connect the second electronic device D2 to the second USB interface IN2.

Conversely, when the first electronic device D1 is electrically connected to the second USB interface IN2, the microcontroller 1 firstly detects the first USB interface IN1 without finding that the first electronic device D1 is electrically connected to the first USB interface IN1 through the operation program, and the microcontroller 1 then detects the second USB interface IN2 through the operation program. When the microcontroller 1 detects that the second USB interface IN2 is electrically connected to the first electronic device D1 through the operation program, the microcontroller 1 sets the second USB interface IN2 as the uplink port and sets the first USB interface IN1 as the downlink port through the operation program. At this time, the user can electrically connect the second electronic device D2 to the first USB interface IN1.

The first signal multiplexer 2A is electrically connected to the microcontroller 1. The first signal multiplexer 2A is configured to be electrically connected to the first electronic device D1 through the uplink port. The uplink port is capable of receiving a first signal from the first electronic device D1, and is configured to select and output a video signal through the first signal. Specifically, the first signal multiplexer 2A corresponds to the uplink port. The first signal multiplexer 2A is capable of receiving the first signal transmitted by the first electronic device D1. The first signal may include a first video signal, a first command signal, and a first data signal. In other words, the first signal is capable of selecting whether to output the first video signal through the first command signal.

The second signal multiplexer 2B is electrically connected to the microcontroller 1. The second signal multiplexer 2B is configured to be electrically connected to the second electronic device D2 through the downlink port. The second signal multiplexer 2B is capable of receiving a second signal from the second electronic device D2. Specifically, the second signal multiplexer 2B corresponds to the downlink port. The second signal multiplexer 2B is capable of receiving the second signal of the second electronic device D2. The second signal may include a second video signal, a second command signal, and a second data signal. In other words, the second signal is capable of selecting whether to output the second video signal through the second command signal.

The video signal processor 3 is electrically connected to the microcontroller 1 and the first signal multiplexer 2A. The video signal processor 3 is configured to receive and process a video signal (i.e., the first video signal or the second video signal). The video signal converter 4 is electrically connected to the video signal processor 3. The video signal converter 4 is capable of receiving the video signal that has undergone signal processing by the video signal processor 3. The video signal converter 4 is configured to convert the video signal into a video output signal that is capable of being output to the video signal output terminal OUT for playing.

Specifically, the video signal processor 3 receives and processes the video signal that is transmitted from the uplink port to the first signal multiplexer 2A. Then, the video signal converter 4 converts the video signal into the video output signal. The video signal converter 4 outputs the video output signal to the video signal output terminal OUT for playing. The video signal output terminal OUT is configured to electrically connect to a display device D3, and the display device D3 in the present embodiment is a monitor, but the present disclosure is not limited thereto.

Preferably, each of the first electronic device D1 and the second electronic device D2 is installed with an application program that is capable of transmitting a switching signal to the microcontroller 1. The microcontroller 1 controls the first USB interface IN1 corresponding to the uplink port to be set as the downlink port through the switching signal. The microcontroller 1 controls the second USB interface IN2 corresponding to the downlink port to be set as the uplink port through the switching signal.

Specifically, the application program may be actively installed by the microcontroller 1 or installed by the user on the first electronic device D1 and the second electronic device D2. The user can select the USB interface (i.e., the first USB interface IN1 or the second USB interface IN2) corresponding to the uplink port through the application program. For example, the first electronic device D1 is electrically connected to the first USB interface IN1 that is the uplink port, and the second electronic device D2 is electrically connected to the second USB interface IN2 that is the downlink port. When the user wants to switch the second USB interface IN2 to the uplink port, the user can send the switching signal transmitted from the application program to the microcontroller 1, so that the microcontroller 1 sets the second USB interface IN2 as the uplink port and sets the first USB interface IN1 as the downlink port.

In other words, at a first time point, the microcontroller 1 controls the video signal processor 3 to process the first video signal of the first electronic device D1. Then, the video signal converter 4 converts the first video signal into a first video output signal and outputs the first video output signal to the video signal output terminal OUT, so that the screen image of the first electronic device D1 can be played on the display device D3. At a second time point, when the microcontroller 1 receives the switching signal that is transmitted by the user through the application program, the microcontroller 1 controls the video signal processor 3 to process the second video signal. Then, the video signal converter 4 converts the second video signal into a second video output signal and outputs the second video output signal to the video signal output terminal OUT, so that the image displayed by the display device D3 is switched from the screen of the first electronic device D1 to the screen of the second electronic device D2.

Additionally, the docking station 100 includes a manual control interface 6. For example, a button or operation interface is disposed on a surface of the docking station 100. The manual control interface 6 is electrically connected to the microcontroller 1. The manual control interface 6 is configured to transmit the switching signal to the microcontroller 1. The microcontroller 1 controls the first USB interface IN1 correspond to the uplink port to be set as the downlink port, and the second USB interface corresponding to the downlink port to be set as the uplink port. In other words, the first USB interface IN1 and the second USB interface IN2 can be switched through the switching signal that is transmitted from the application program and the manual control interface 6.

The first power controller 5A is electrically connected between the first signal multiplexer 2A and the first USB interface IN1. The second power controller 5B is electrically connected between the second signal multiplexer 2B and the second USB interface IN2. The operation program is configured to control the first power controller 5A or the second power controller 5B to provide a main electric power to the first electronic device D1 that is electrically connected to the uplink port, wherein the operation program is configured to control the first power controller 5A or the second power controller 5B to provide a remaining electric power to the second electronic device D2 that is electrically connected to the downlink port. The main electric power is electric energy of an output power acceptable by the first electronic device D1, and the remaining electric power is a total electric power of the docking station minus the main electric power.

In detail, the main electric power corresponds to the electronic device (i.e., the first electronic device D1 or the second electronic device D2) electrically connected to the uplink port, and the remaining electric power corresponds to the electronic device electrically connected to the downlink port. For example, the first USB interface IN1 is the uplink port and the second USB interface IN2 is the downlink port. The first electronic device D1 electrically connected to the first USB interface IN1 receives the main electrical power supply, and the second electronic device D2 electrically connected to the second USB interface IN2 receives the remaining power supply. In other words, the operation program firstly controls the docking station 100 to prioritize supplying power to the electronic devices electrically connected to the uplink port, and the electronic devices electrically connected to the downlink port is next-in-line for being supplied with power.

Second Embodiment

Figure 3:
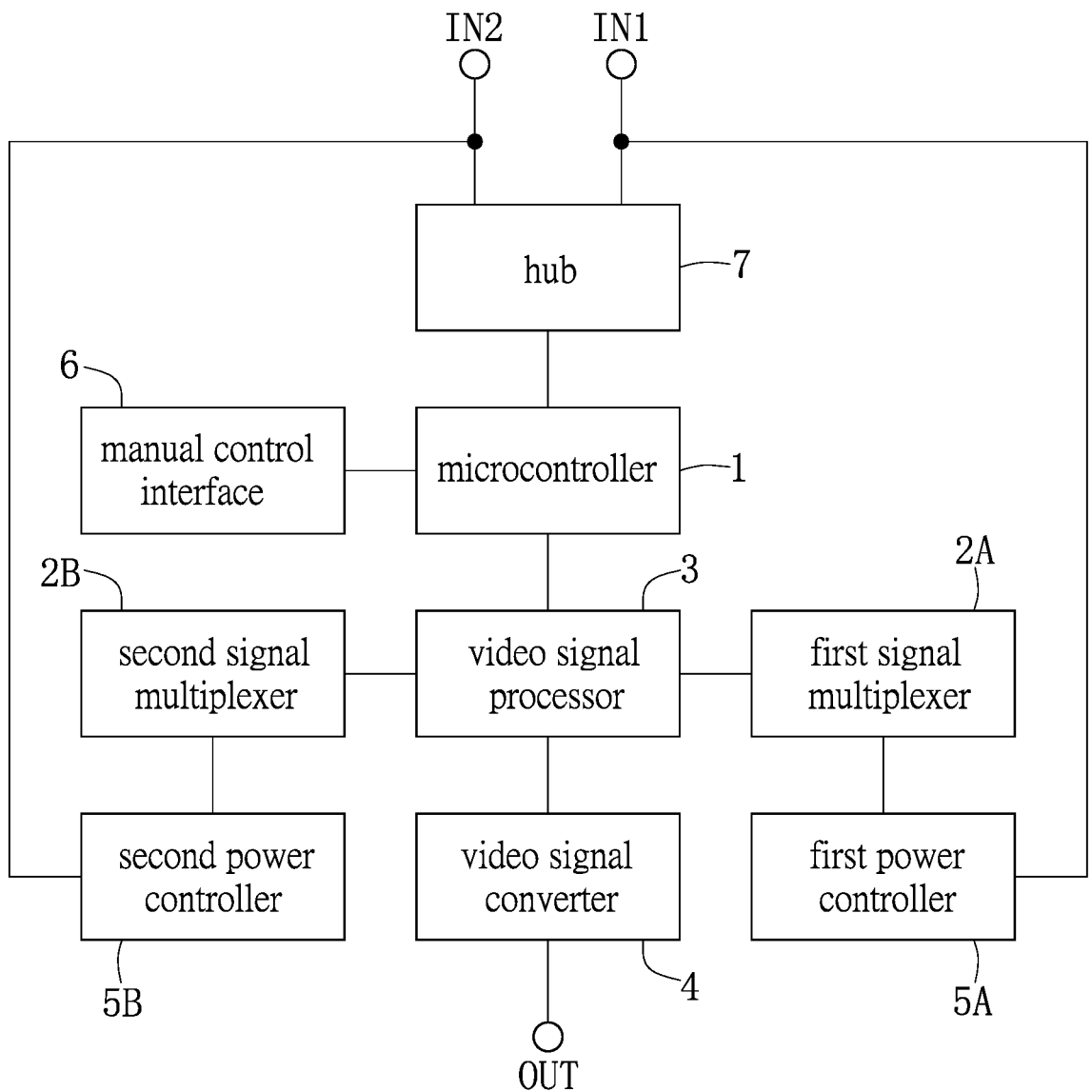
FIG. 3 is a circuit block diagram of a docking station according to a second embodiment of the present disclosure.

Referring to FIG. 3, a second embodiment of the present disclosure provides a docking station 100' further includes a hub 7. The hub 7 is electrically connected to the first USB interface IN1 and the second USB interface IN2. Through the hub 7, the first electronic device D1 is capable of directly accessing the second data signal of the second electronic device D2 by the application program, but the present disclosure is not limited thereto. For example, through the hub 7, the second electronic device D2 is capable of directly accessing the first data signal of the first electronic device D1 by the application program. The details of the file transmission between the first electronic device D1 and the second electronic device D2 through the hub 7 should be understood by a person having ordinary skill in the art, and will be omitted in the present disclosure for the sake of brevity.

Third Embodiment

Figure 4:
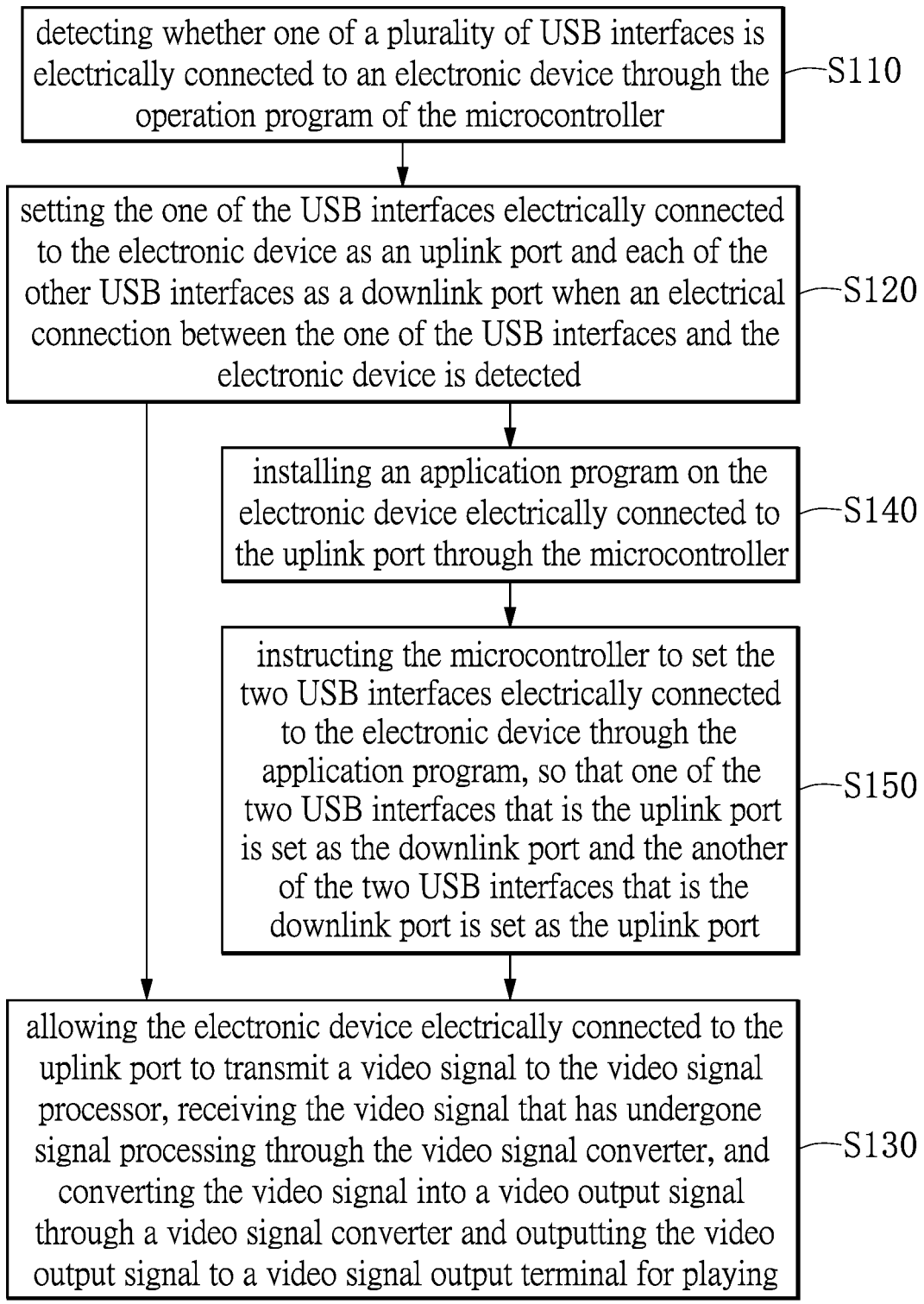
FIG. 4 is a step flow chart of a control method of a docking station according to a third embodiment of the present disclosure.

Referring to FIG. 4, a third embodiment of the present disclosure provides a control method. Since the control method provided in the present embodiment is applicable to the docking station 100, 100' of the first and second embodiment, reference is concurrently made to FIGS. 1 and 3. The control method includes a detection step S110, a setting step S120, a playing step S130, an installation step S140, and a switching step S150. It should be noted that any one of the above steps can be omitted or replaced by a designer.

The detection step S110 is implemented by detecting whether one of a plurality of USB interfaces is electrically connected to an electronic device through the operation program of the microcontroller 1. Specifically, the operation program presets a detection sequence and a presetting sequence, and the microcontroller 1 sequentially detects whether the USB interfaces are electrically connected to the electronic device according to the detection sequence that is preset by operating program.

The setting step S120 is implemented by setting the one of the USB interfaces electrically connected to the electronic device as an uplink port and the other USB interfaces as downlink ports through the operation program when an electrical connection between the one of the USB interfaces and the electronic device is detected through the operation program. Preferably, when the microcontroller 1 sequentially detects the USB interfaces according to the detection sequence that is preset by operating program, and detects two of the USB interfaces are respectively and electrically connected to two electronic devices which are active devices, the operation program sets one of the two USB interfaces as the uplink port according to the presetting sequence.

The playing step S130 is implemented by allowing the electronic device electrically connected to the uplink port to transmit a video signal to the video signal processor 3, and receiving the video signal that has undergone signal processing through the video signal converter 4. In other words, the electronic device connected to the uplink port can output the images therefrom to the display device D3 electrically connected to the video signal output terminal OUT.

The installation step S140 is implemented by installing an application program on the electronic device electrically connected to the uplink port through the microcontroller 1, but the present disclosure is not limited thereto. For example, a user can install the application program to the electronic device by network or other method. That is, the application program is not limited to one installation method.

The switching step S150 is implemented by instructing the microcontroller 1 to set the two USB interfaces electrically connected to the electronic device through the application program, so that one of the two USB interfaces that is the uplink port is set as the downlink port and the another of the two USB interfaces that is the downlink port is set as the uplink port. In other words, the microcontroller 1 can set the uplink port and the downlink ports through the application program.

Fourth Embodiment

Figure 5:
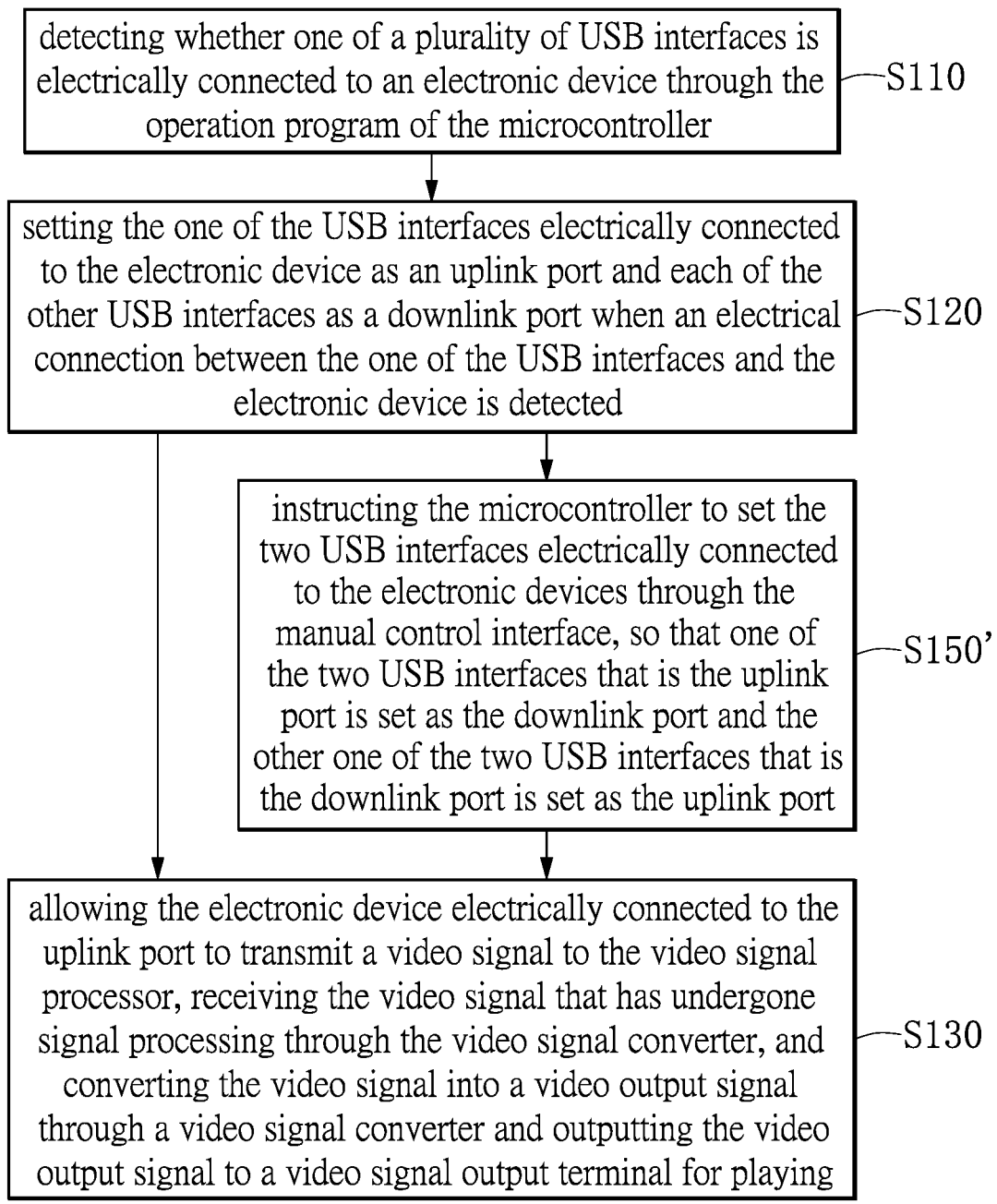
FIG. 5 is a step flow chart of a control method of the docking station according to a fourth embodiment of the present disclosure.

Referring to FIG. 5, a fourth embodiment of the present disclosure provides a control method that is similar to the third embodiment. The difference between the present embodiment and the third embodiment is that the present embodiment does not have the installation step S140 and has a switching step S150 that is different from the third embodiment.

Specifically, in the fourth embodiment, the switching step S150' is implemented by instructing the microcontroller 1 to set the two USB interfaces electrically connected to the electronic devices through the manual control interface 6, so that one of the two USB interfaces that is the uplink port is set as the downlink port and the other one of the two USB interfaces that is the downlink port is set as the uplink port. Accordingly, a user can directly manually set the USB interfaces as the uplink port and the downlink ports directly through the manual control interface 6.

In conclusion, the docking station 100 and the control method thereof of the present disclosure can detect the USB interfaces through the microcontroller 1, in which one of the USB interfaces that is firstly and electrically connected to the electronic device can be set as the uplink port, and the other USB interfaces can be set as the downlink ports. Accordingly, when using the docking station of the present disclosure, a user can directly and electrically connect the electronic device to any one of the USB interfaces without the need of identifying which is one of the USB interfaces is the uplink port. The microcontroller 1 can automatically set one of the USB interfaces electrically connected to the electronic device as the uplink port to output the video signal to the video signal output terminal OUT for playing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A docking station, comprising a first universal serial bus (USB) interface, a second USB interface, and a video signal output terminal, wherein the docking station further includes:
   a microcontroller electrically connected to the first USB interface and the second USB interface, wherein the microcontroller is capable of determining through an operation program whether or not the first USB interface or the second USB interface is electrically connected to a first electronic device, and wherein when the first USB interface is electrically connected to the first electronic device, the operation program sets the first USB interface as an uplink port and the second USB interface as a downlink port;

a first signal multiplexer electrically connected to the microcontroller, wherein the first signal multiplexer is configured to be electrically connected to the first electronic device through the uplink port, and wherein the uplink port is capable of receiving a first signal from the first electronic device, and is configured to select and output a video signal through the first signal;

a second signal multiplexer electrically connected to the microcontroller, wherein the second signal multiplexer is configured to be electrically connected to a second electronic device through the downlink port, and wherein the second signal multiplexer is capable of receiving a second signal from the second electronic device;

a video signal processor electrically connected to the microcontroller and the first signal multiplexer, wherein the video signal processor is configured to receive and process the video signal; and a video signal converter electrically connected to the video signal processor, wherein the video signal converter is capable of receiving the video signal that has undergone signal processing by the video signal processor, and wherein the video signal converter is configured to convert the video signal into a video output signal that is capable of being output to the video signal output terminal for playing.

2. The docking station according to claim 1, further comprising a first power controller and a second power controller, wherein the first power controller is electrically connected between the first signal multiplexer and the first USB interface, wherein the second power controller is electrically connected between the second signal multiplexer and the second USB interface, wherein the operation program is configured to control the first power controller or the second power controller to provide a main electric power to the first electronic device that is electrically connected to the uplink port, wherein the operation program is configured to control the first power controller or the second power controller to provide a remaining electric power to the second electronic device that is electrically connected to the downlink port, and wherein the main electric power is electric energy of an output power acceptable by the first electronic device, and the remaining electric power is a total electric power of the docking station minus the main electric power.

3. The docking station according to claim 1, further comprising a manual control interface, wherein the manual control interface is electrically connected to the microcontroller, wherein the manual control interface is configured to transmit a switching signal to the microcontroller, and wherein the microcontroller controls the first USB interface corresponding to the uplink port to be set as the downlink port and the second USB interface corresponding to the downlink port to be set as the uplink port.

4. The docking station according to claim 1, wherein the first electronic device and the second electronic device are each installed with an application program that is capable of transmitting a switching signal to the microcontroller, wherein the microcontroller controls the first USB interface corresponding to the uplink port to be set as the downlink port through the switching signal, and wherein the microcontroller controls the second USB interface corresponding to the downlink port to be set as the uplink port through the switching signal.

5. The docking station according to claim 4, further comprising a hub electrically connected to the first USB interface and the second USB interface, and wherein through the hub, the first electronic device is capable of directly accessing data of the second electronic device by the application program.

6. The docking station according to claim 1, wherein connector specifications of the first USB interface and the second USB interface are USB Type-C, and wherein transmission specifications of the first USB interface and the second USB interface are USB 3.1.

7. A control method of a docking station, comprising:

detecting whether one of a plurality of USB interfaces is electrically connected to an electronic device;

setting the one of the USB interfaces electrically connected to the electronic device as an uplink port and each of the other USB interfaces as a downlink port when an electrical connection between the one of the USB interfaces and the electronic device is detected;

allowing the electronic devices electrically connected to the uplink port to transmit a video signal to a video signal processor, wherein the video signal processor receives and processes the video signal;

receiving the video signal that has undergone signal processing through the video signal processor; and converting the video signal into a video output signal through a video signal converter and outputting the video output signal to a video signal output terminal for playing.

8. The control method according to claim 7, further comprising:

presetting a detection sequence and a preset sequence; and sequentially detecting whether the USB interfaces are electrically connected to a plurality of electronic devices according to the detection sequence, wherein when two of the electronic devices of which two of the USB interfaces are each electrically connected as an active device are detected, setting one of the two USB interfaces to be the uplink port and the other one of the two USB interfaces to be the downlink port according to the preset sequence.

9. The control method according to claim 8, further comprising:

installing an application program on one of the electronic devices electrically connected to the uplink port; and instructing the microcontroller to set the two USB interfaces electrically connected to the electronic devices through the application program, so that one of the two USB interfaces that is the uplink port is set as the downlink port and the other one of the two USB interfaces that is the downlink port is set as the uplink port.

10. The control method according to claim 8, further comprising:

instructing the microcontroller to set the two USB interfaces electrically connected to the electronic devices through a manual control interface, so that one of the two USB interfaces that is the uplink port is set as the downlink port and the other one of the two USB interfaces that is the downlink port is set as the uplink port.

* * * * *